(No Model.)
W. MILLER.
ANIMAL CATCHING DEVICE.
No. 374,488. Patented Dec. 6, 1887.
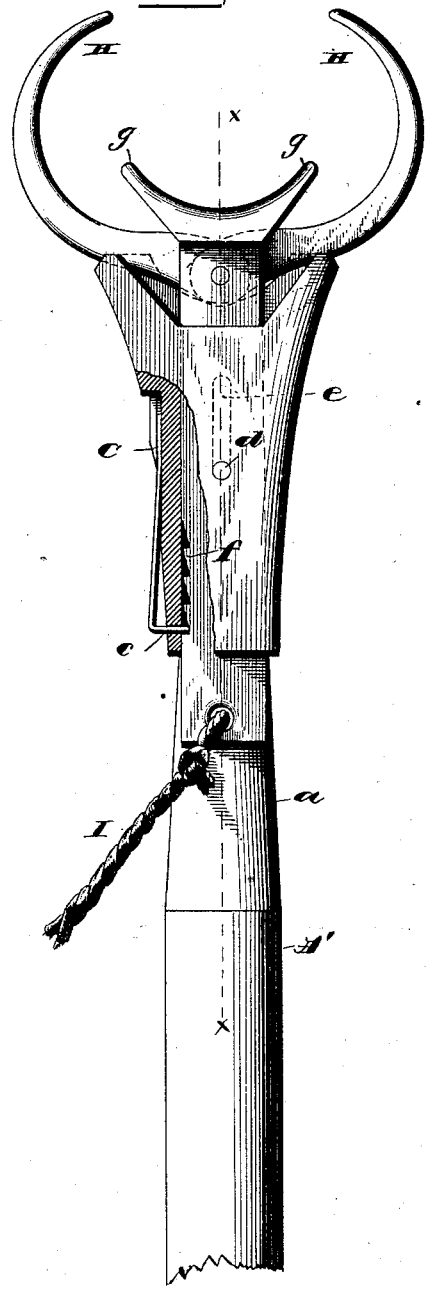
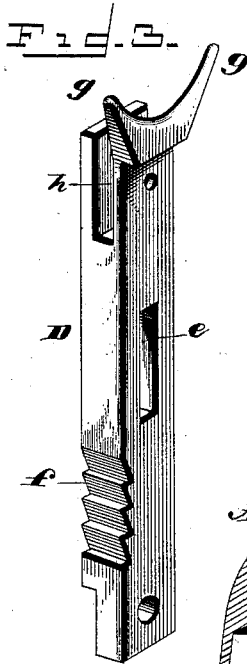
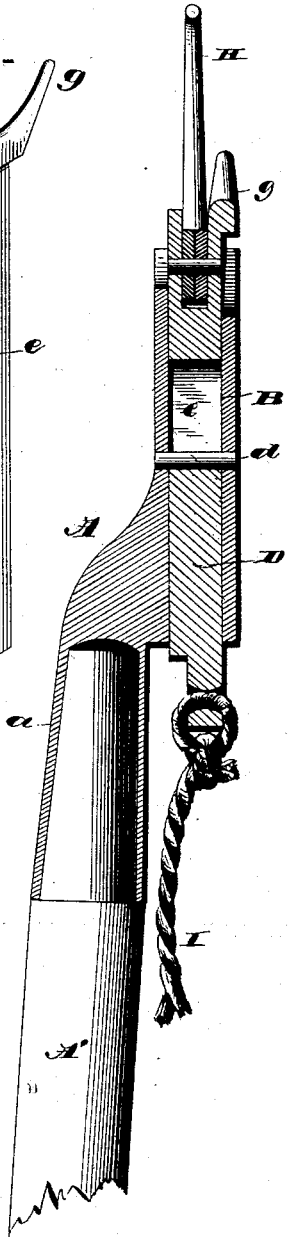
WITNESSES
G. S. Elliott
E. M. Johnson
Wesley Miller
INVENTOR
Attorney

United States Patent Office.

WESLEY MILLER, OF BLANCHARD, IOWA.

ANIMAL-CATCHING DEVICE.

SPECIFICATION forming part of Letters Patent No. 374,488, dated December 6, 1887.

Application filed February 24, 1887. Serial No. 228,735. (No model.)

*To all whom it may concern:*

Be it known that I, WESLEY MILLER, a citizen of the United States of America, residing at Blanchard, in the county of Page and State of Iowa, have invented certain new and useful Improvements in Animal-Catching Devices; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in animal-catching devices; and it consists in the construction and combination of the parts, as will be hereinafter fully set forth, and specifically pointed out in the claims, the object of my invention being to furnish a device by which animals can be easily caught, the same being designed particularly for catching hogs and sheep and the smaller classes of live-stock.

In the accompanying drawings, which illustrate my invention, Figure 1 is a side view, partly broken away and in section, of my improved catching and holding tool. Fig. 2 is a sectional view taken through the line $x$ $x$ of Fig. 1, and Fig. 3 is a detail perspective view.

A is a metallic head, which is preferably made of a single casting, the same being provided with a socket, $a$, which is located to one side of the head for the reception of the end of a suitable handle, A'. The head A has a longitudinal rectangular recess, B, and the upper ends of the casting diverge from each other, the inner sides of these diverging portions being at an angle with the rectangular recess B. The casting or head A has suitably secured at one side a spring, C, the end of which is bent so as to pass through an opening, $c$, so as to engage with a sliding block, D, the limit of the movement of this sliding block within the recess being governed by a pin, $d$, which passes through and is secured within perforations in the head A, as well as through a slot, $e$, in the sliding bar D, hereinbefore referred to. The size of the sliding bar D is such that it may move freely within the longitudinal recess B, and it is provided at one side with notches or ratchet-teeth $f$, with which the bent end of the spring C engages, so as to hold the same rigid in one direction and allow it to slip freely over said ratchet-teeth in an opposite direction. The upper end of the sliding bar D is provided with projecting arms $g$ $g$, between which is a curved surface, these projecting arms extending beyond one end of the block, and between these projecting arms and the opposite side of said block is a recess, $h$, within which is pivoted curved arms H H.

I is a cord or rope which is passed through the end of the sliding bar D adjacent to the socket.

The operation of my invention is as follows: When it is desired to catch an animal with my improved catching and holding tool, the parts are organized so as to occupy the position as shown in Fig. 1, so that the arms H H will be extended. The implement is then placed over the leg of an animal, and when the portion of the sliding bar D between the projecting portions $g$ $g$ comes in contact with the leg it will be forced into the recess, said movement causing the lower outer edges of the arms H H to contact with the beveled edges of the recess, so as to close the same upon the leg of the animal, and the bar will be held against an outward movement by the spring which engages with the ratchet-teeth.

Instead of pushing the implement against the animal's leg, as hereinbefore described, a movement so as to close the pivoted arms can be caused by drawing upon the cord I.

I am aware that prior to my invention it has been proposed to provide an animal-catcher with a spring-bar which moves within a suitable head, the movement of said sliding bar operating pivoted arms which encircle the leg of the animal, and I therefore do not claim this feature of my invention, broadly; but

What I claim as new, and desire to secure by Letters Patent, is—

1. The combination, substantially as before set forth, of the head having a longitudinal recess flared at its outer end, the sliding bar seated within said recess, and the curved arms pivoted at their inner ends on a single bolt or pin secured to the sliding bar a little below its outer end.

2. In an animal catching and holding tool, the combination of a casting provided with a longitudinal recess and an enlarged end with inwardly-beveled portions which terminate at the upper end of said recess, a spring, C, a sliding bar, D, provided with ratchet-teeth with which the spring engages, projecting portions $g\ g$, and curved arms H H, pivoted to the upper end of the sliding bar, substantially as shown, and for the purpose set forth.

3. The combination, in an implement for catching and holding animals, of a casting made of a single piece, comprising a body portion having a longitudinal recess, a socket for the reception of the end of a pole, enlarged end with beveled sides extending from said longitudinal recess, and a spring, C, attached to said casting, of a sliding bar having ratchet-teeth $f$, central slot, $e$, through which passes a suitable pin, and a slotted end, within which is pivoted curved arms H H, and the cord I, substantially as shown, and for the purpose set forth.

In testimony whereof I affix my signature in presence of two witnesses.

WESLEY MILLER.

Witnesses:
I. M. POTTER,
NATHEN HARYER.